(12) United States Patent
Komatsubara et al.

(10) Patent No.: US 12,046,710 B2
(45) Date of Patent: Jul. 23, 2024

(54) LITHIUM ION SECONDARY BATTERY

(71) Applicant: JTEKT CORPORATION, Osaka (JP)

(72) Inventors: Yukihiro Komatsubara, Osaka (JP); Takumi Mio, Osaka (JP); Kentaro Iizuka, Osaka (JP); Takafumi Fujii, Osaka (JP); Koji Nishi, Osaka (JP); Naoki Ohmi, Osaka (JP); Yusuke Kimoto, Osaka (JP)

(73) Assignee: JTEKT CORPORATION, Kariya (JP)

( * ) Notice: Subject to any disclaimer, the term of this patent is extended or adjusted under 35 U.S.C. 154(b) by 828 days.

(21) Appl. No.: 17/051,968

(22) PCT Filed: Apr. 26, 2019

(86) PCT No.: PCT/JP2019/017864
§ 371 (c)(1),
(2) Date: Oct. 30, 2020

(87) PCT Pub. No.: WO2019/212040
PCT Pub. Date: Nov. 7, 2019

(65) Prior Publication Data
US 2021/0234190 A1     Jul. 29, 2021

(30) Foreign Application Priority Data

May 2, 2018   (JP) ................................ 2018-088674

(51) Int. Cl.
*H01M 10/0525* (2010.01)
*H01M 4/04* (2006.01)
(Continued)

(52) U.S. Cl.
CPC ..... *H01M 10/0525* (2013.01); *H01M 4/0404* (2013.01); *H01M 4/366* (2013.01);
(Continued)

(58) Field of Classification Search
CPC ......... H01M 10/0525; H01M 10/0568; H01M 10/0569; H01M 4/0404; H01M 4/366;
(Continued)

(56) References Cited

U.S. PATENT DOCUMENTS

2005/0164081 A1* 7/2005 Ogura .................... H01M 50/55
429/185
2009/0297954 A1* 12/2009 Hasegawa ......... H01M 10/0525
429/188

(Continued)

FOREIGN PATENT DOCUMENTS

JP      2002-42817 A    2/2002
JP      2003-7331 A     1/2003
(Continued)

OTHER PUBLICATIONS

English translation of the International Preliminary Report on Patentability issued on Nov. 12, 2020 in PCT/JP2019/017864, 6 pages.

(Continued)

*Primary Examiner* — James Lee
(74) *Attorney, Agent, or Firm* — Oblon, McClelland, Maier & Neustadt, L.L.P.

(57) ABSTRACT

A lithium ion secondary battery that can operate in a high-temperature environment of 85° C. The lithium ion secondary battery includes a positive electrode active material that can store and release lithium ions Li', a positive electrode binder that binds the positive electrode active material, a negative electrode active material that can store and release lithium ions Li$^+$, a negative electrode binder that binds the negative electrode active material, and an electrolytic solution containing an organic solvent and an imide-based lithium salt. The negative electrode active material is previously doped with lithium ions. The positive electrode binder has a Hansen solubility parameter-based relative (Continued)

energy difference (RED) value of more than 1 with respect to the electrolytic solution.

4 Claims, 8 Drawing Sheets

(51) Int. Cl.
*H01M 4/36* (2006.01)
*H01M 4/58* (2010.01)
*H01M 4/62* (2006.01)
*H01M 4/66* (2006.01)
*H01M 10/0568* (2010.01)
*H01M 10/0569* (2010.01)
*H01M 4/02* (2006.01)

(52) U.S. Cl.
CPC .............. *H01M 4/58* (2013.01); *H01M 4/622* (2013.01); *H01M 4/662* (2013.01); *H01M 10/0568* (2013.01); *H01M 10/0569* (2013.01); *H01M 2004/027* (2013.01); *H01M 2004/028* (2013.01); *H01M 2300/0028* (2013.01)

(58) Field of Classification Search
CPC ........ H01M 4/58; H01M 4/622; H01M 4/662; H01M 2004/027; H01M 2004/028; H01M 2300/0028
See application file for complete search history.

(56) References Cited

U.S. PATENT DOCUMENTS

2016/0314909 A1   10/2016  Matsuura et al.
2020/0395594 A1*  12/2020  Doi ..................... H01M 4/0459

FOREIGN PATENT DOCUMENTS

| JP | 2005-332657 A | 12/2005 |
| JP | 2010-160986 A | 7/2010 |
| JP | 2010-267875 A | 11/2010 |
| JP | 2012-204155 A | 10/2012 |
| JP | 2014-160638 A | 9/2014 |
| JP | 2016-61562 A | 4/2016 |
| JP | 2017-17299 A | 1/2017 |
| WO | WO2019/156090 A1 | 8/2019 |

OTHER PUBLICATIONS

Office Action issued Feb. 14, 2023, in corresponding Japanese Patent Application No. 2020-517064 (with English Translation), 6 pages.
Extended European Search Report issued Jan. 4, 2022 in European Patent Application No. 19796966.0, 7 pages.
International Search Report issued on Jul. 30, 2019 in PCT/JP2019/017864 filed on Apr. 26, 2019, 1 page.
Notice of Reasons for Refusal issued Jul. 4, 2023 in Japanese Patent Application No. 2020-517064 (with English language translation), 10 pages.

* cited by examiner

FIG. 15

LITHIUM ION SECONDARY BATTERY

CROSS-REFERENCE TO RELATED APPLICATIONS

The present application is a U.S. National Phase entry of, and claims priority to, PCT Application PCT/JP2019/017864, filed. Apr. 26, 2019, which claims priority to Japanese Patent Application No. 2018-088674, filed May 2, 2018, both of which are incorporated herein by reference in their entireties for all purposes.

BACKGROUND

The present disclosure relates to lithium ion secondary batteries.

A lithium ion secondary battery exhibits excellent characteristics, such as excellent energy density. Therefore, lithium ion secondary batteries are in widespread use. Lithium ion secondary batteries can be used for more various purposes if they become more excellent in. heat resistance. Accordingly, various technologies have been proposed for improving the heat resistance of lithium ion secondary batteries. For example, Japanese Laid-Open Patent Publication No. 2014-160638 discloses a lithium ion secondary battery having a heat resistance up to about 60° C.

However, the heat resistance of the lithium ion secondary battery disclosed in Japanese Laid-Open Patent Publication No. 2014-160638 is only up to 60° C. Thus, a lithium ion secondary battery capable of withstanding a higher temperature has been required. For example, in. order to use a lithium ion secondary battery in an automobile, it is required to improve the heat resistance of the lithium ion secondary battery to about 85° C.

BRIEF SUMMARY

In one aspect of the present disclosure, a lithium ion secondary battery comprising a positive electrode active material capable of storing and releasing lithium ions, a positive electrode binder for binding the positive electrode active material, a negative electrode active material capable of storing and releasing lithium ions, a negative electrode binder for binding the negative electrode active material, and an electrolytic solution which includes an organic solvent and an imide-based lithium salt. The negative electrode active material is pre-doped with. the lithium ions and the positive electrode binder has a Hansen solubility parameter-based RED value of more than 1 with respect to the electrolytic solution.

According to the above-described aspect, the lithium ion secondary battery can have the heat resistance at about 85° C. When it is mentioned that a lithium ion secondary battery has heat resistance in the present disclosure, it is meant that the lithium ion secondary batter has performance operable in a high temperature environment.

DETAILED DESCRIPTION

Figure 1:
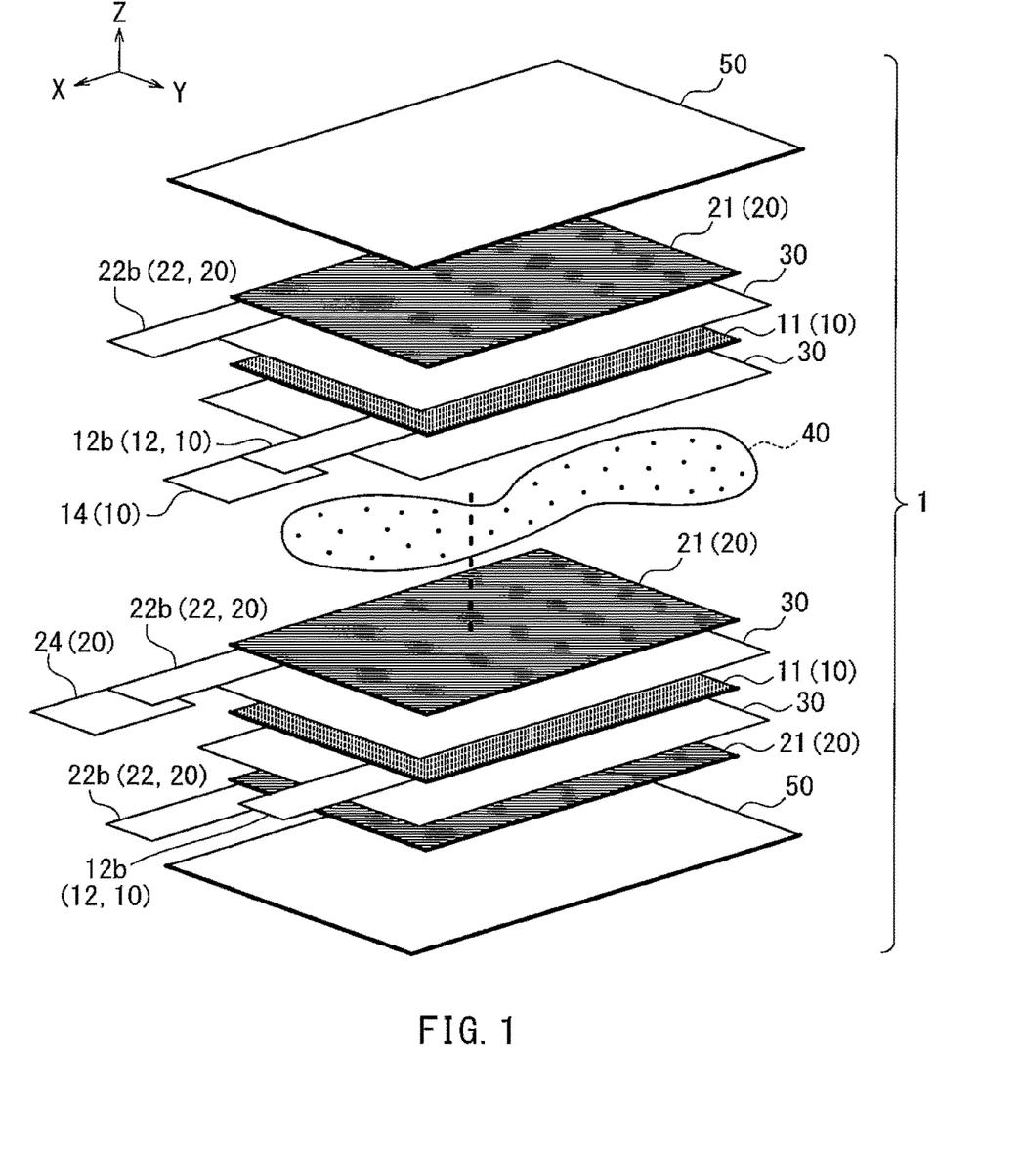
FIG. 1 is a schematic perspective view of an exploded lithium ion secondary battery according to an embodiment.

An embodiment of the present disclosure will be described, with reference to the Figures. As shown in the exploded perspective view of FIG. 1, the lithium ion secondary battery 1 includes a plurality of plate-like positive electrode plates 11 and a plurality of plate-like negative electrode plates 21, which are alternately arranged. Each positive electrode plate 11 is provided with an electrode terminal connection part 12b projecting in one direction. Each negative electrode plate 21 is also provided with an electrode terminal connection part 22b projecting in the same direction as the direction, in which the electrode terminal connection part 12b of the positive electrode plate 11 protrudes. As shown in FIG. 1, the direction in which the electrode terminal connection pan 12b of the positive electrode plate 11 projects is defined as an X-axis direction, and the direction in which the positive electrode plate 11 is laminated with the negative electrode plate 21 is defined as a Z-axis direction, and the direction orthogonal to both X-axis and Z-axis is defined as a Y-axis direction. The X-axis, the Y-axis, and the Z-axis are orthogonal to each other. In all figures in which the X-axis, the Y-axis and the Z-axis are illustrated, each of these axial directions indicates the same direction. The below description regarding the direction may be explained on the basis of these axial directions. Adjunctive elements mentioned in the following description are omitted from the drawings and will not described in detail.

<1. The Overall Structure of the Lithium Ion Secondary Battery 1 (FIGS. 1 to 3)>

As shown in FIG. 1, the lithium ion secondary battery 1 includes a plurality of positive electrode plates 11, a plurality of negative electrode plates 21, a plurality of separators 30, an electrolytic solution 40, and laminate members 50, As shown in FIG. 1, the positive electrode plates 11 and the negative electrode plates 21 are alternately laminated such that the separator 30 is interposed between each adjacent positive electrode plate 11 and negative electrode plate 21. The electrolyte 40 is sealingly enclosed by a pair of the laminate members 50, being enclosed together with a part of each positive electrode plate 11, a part of each negative electrode plate 21, and the separators 30, which are laminated in this manner.

The electrode terminal connection parts 12b of the plurality of positive electrode plates 11 protrude in the same direction and are electrically connected to a positive electrode terminal 14. Conductive members constituting a positive electrode terminal side, such as the positive electrode terminal 14 and the plurality of positive electrode plates 11 connected thereto, can collectively be called a positive electrode 10. Similarly, the electrode terminal connection parts 22b of the plurality of negative electrode plates 21 are electrically connected to a negative electrode terminal 24. Conductive members constituting a negative electrode terminal side, such as the negative electrode terminal 24 and the plurality of negative electrode plates 21 connected thereto, can collectively be called a negative electrode 20.

Figure 2:
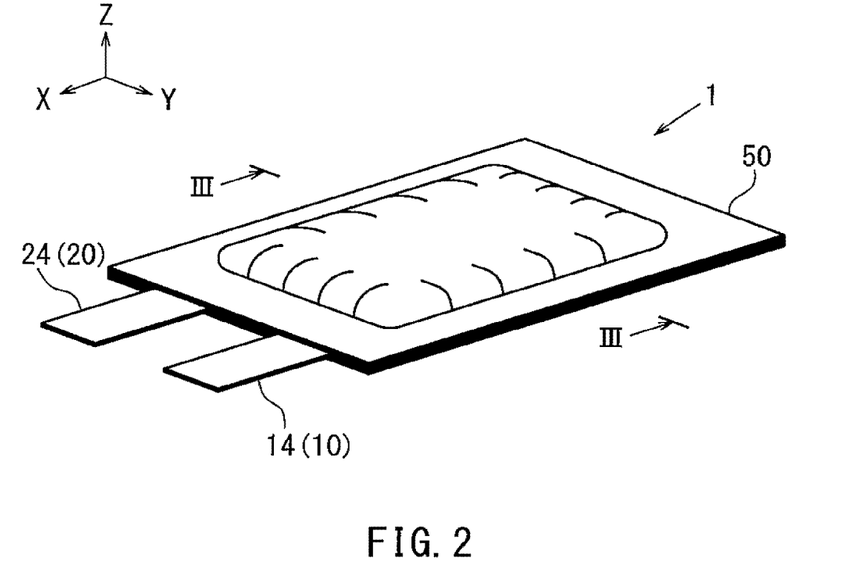
FIG. 2 is a perspective view of the lithium ion secondary battery according to the embodiment.
Figure 3:
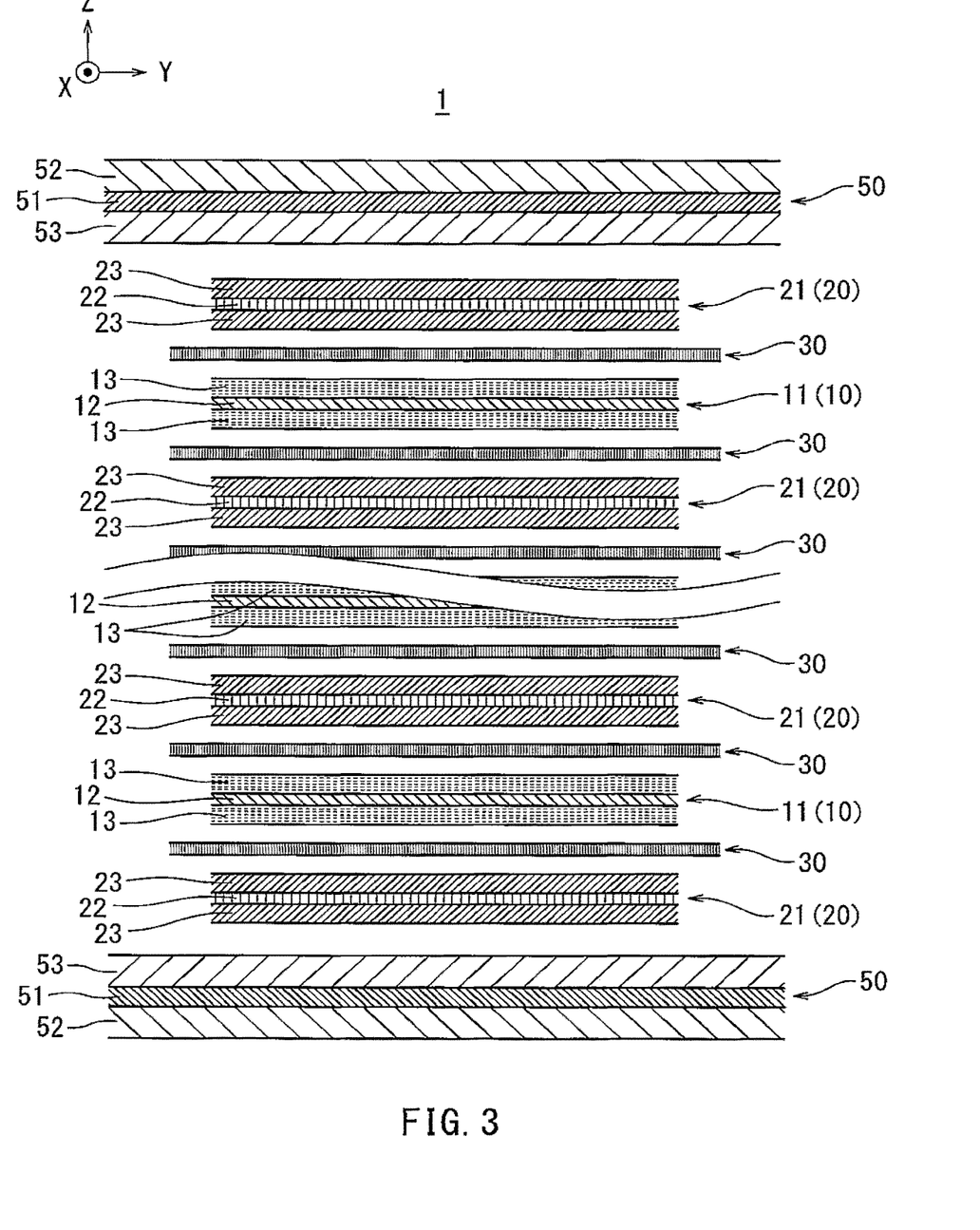
FIG. 3 is a schematic cross-sectional view of the lithium ion secondary battery, taken along line III-III of FIG. 2.

The lithium ion secondary battery 1 generally has the above-described elements. FIG. 2 shows its general appearance. FIG. 3 schematically shows a cross-section of the lithium ion secondary battery 1 shown in FIG. 2, taken along line III-III. In FIG. 3, an interval is provided between each member in the lithium ion secondary battery 1 for clear understanding. However, in practice, the positive electrode plates 11, the negative electrode plates 21, and the separators 30 are laminated with almost no gap.

<2. Each Part of the Lithium ion Secondary Battery 1 (FIGS. 1 and 3 to 7)>

<2-1. The positive electrode plate 11 (FIGS. 1 and 3 to 5)>

Figure 4:
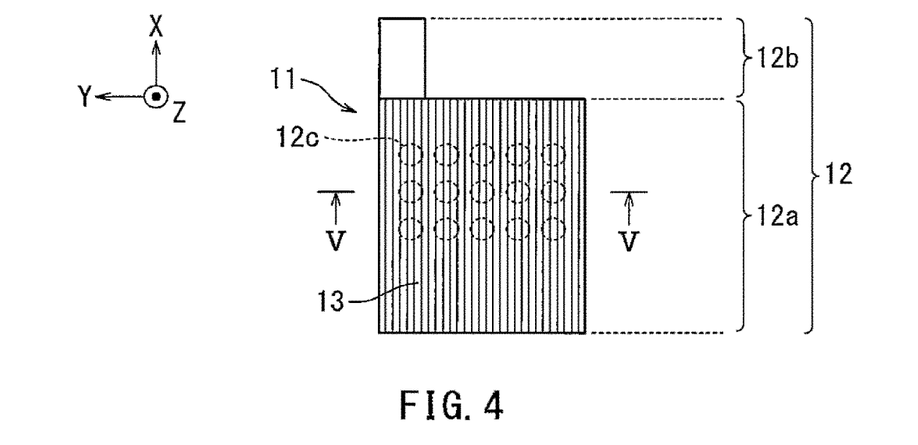
FIG. 4 is a diagram illustrating an example of the appearance of a positive electrode plate shown in FIG. 1.
Figure 5:
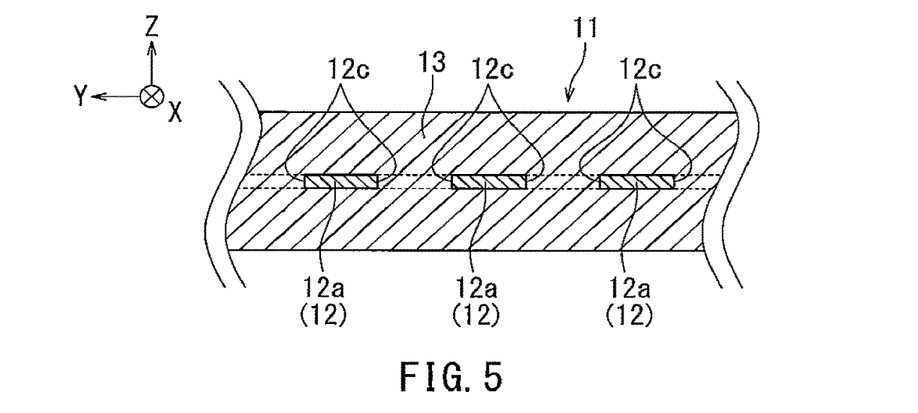
FIG. 5 is a cross-sectional view of the positive electrode plate, taken along line V-V of FIG. 4.

As shown in FIGS. 3 to 5, the positive electrode plate 11 is provided with a thin plate-like positive electrode current collector 12 and a positive electrode active material layer 13 coating the positive electrode current collector 12. The positive electrode active material layer 13 may be on both surfaces of the positive electrode current collector 12. However, it may instead be on one of either sides of the positive electrode current collector 12. During the manufacturing process, the positive electrode current collector 12 is coated with the positive electrode active material layer 13. It is then necessary to sufficiently dry the layered positive electrode active material 13 such that the lithium ion secondary batter 1 does not contain excessive water.

The positive electrode current collector 12 is a metal foil, in which a plurality of holes 12c extending therethrough in the Z direction are formed (see FIGS. 4 and 5). The positive electrode current collector 12 includes a rectangular current collecting portion 12a (see FIG. 4) and an electrode terminal connection part 12b projecting outward from an edge (the left end of the upper side in the example of FIG. 4) of the current collecting portion 12a. The width in the Y-axis direction of the electrode terminal connection part 12b shown in FIGS. 1 and 4 can be changed appropriately, for example, to be the same width as that of the current collecting portion 12a. A plurality of holes 12c may be formed in the current collecting portion 12a (see FIGS. 4 and 5). However, a plurality of holes similar to the holes 12c of the current collecting portion 12a may or may not be formed in the electrode terminal connecting part 12b. Since the holes 12c are formed in the current collector 12a, cations and anions contained in the electrolytic solution 40 can pass through the current collector 12a. It is possible that the current collecting portion 12a does not have the holes 12c, and the electrode terminal connection part 12b does not have any holes similar to the holes 12c. A metal foil made of, for example, aluminum, stainless steel, copper, and/or nickel can be used as the positive electrode current collector 12.

The positive electrode active material layer 13 includes a positive electrode active material capable of storing and releasing lithium ions and includes a positive electrode binder, The positive electrode binder allows binding of the positive electrode active material and allows binding between the positive electrode active material and a current collecting portion 12a of a positive electrode current collector 12. In this way, the positive electrode active material layer 13 is configured to store and release lithium ions by having a positive electrode active material, The positive electrode active material layer 13 may further include other components, such as a conductive assistant to enhance electric conductivity of the positive electrode active material layer 13 and/or a thickener to facilitate formation a positive electrode plate 11. The conductive assistant may be, for example, Ketjenblack, acetylene black, graphite fine particles, graphite fine fibers, etc. The thickener may be, for example, carboxymethyl cellulose [CMC], etc.

The positive electrode active material may be one or more materials which are used as a positive electrode active material in conventional lithium ion secondary batteries and which are capable of storing and releasing lithium ions. Examples of the positive electrode active material include manganese dioxide ($MnO_2$), iron oxide, copper oxide, nickel oxide. lithium manganese composite oxide (e.g., $Li_xMn_2O_4$ or $Li_xMnO_2$), lithium nickel composite oxide (for example, $Li_xNiO_2$), lithium cobalt composite oxide ($Li_xCoO_2$), lithium nickel cobalt composite oxide (e.g., $LiNi_{1-y}Co_yO_2$), lithium nickel cobalt manganese composite oxide (NMC, ternary, $LiNi_xCo_yMn_{1-y-z}O_2$), spinel type lithium-manganese-nickel composite oxide ($Li_xMn_{2-y}Co_yO_4$), lithium polyanion compounds ($LiFePO_4$, $LiCoPO_4$, $LiVOPO_4$, $LiVPO_4F$, $LiMnPO_4$, $LiMn_{1-x}Fe_xPO_4$, $LiNiVO_4$, $LiCoPO_4$, $Li_3V_2(PO_4)_3$, $LiFeP_2O_7$, $Li_3Fe_2(PO_4)_3$, $Li_2CoSiO_4$, $Li_2MnSiO_4$, $Li_2FeSiO_4$, $LiTePO_4$, etc.) iron sulfate ($Fe_2(SO_4)_3$), vanadium oxide (for example, $V_2O_5$), and the like. Further examples include conductive polymer materials, such as polyaniline and polypyrrole, disulfide polymers, organic materials, and inorganic materials, such as sulfur (S) and carbon fluoride. These may be used singly or in a mixture of two or more kinds.

The positive electrode active material is preferably a material with an upper limit of the operating potential with reference to Li that is less than a predetermined value. As used herein, the operating potential with reference to Li refers to the operating potential with respect to a $Li/Li^+$ reference electrode. For example, this predetermined value of the operating potential with reference to Li may, for example, be 5.0 V, 4.0 V, 3.8 V, or 3,6 V. For example, spinel type lithium manganese nickel composite oxide ($Li_xMn_{2-y}Ni_yO_4$) may be named as a positive electrode active material with the upper limit of the operation potential with reference to Li of less than 5.0 V, when this predetermined value is 5.0 V. Further, for example, lithium manganese composite oxide (e.g., $Li_xMn_2O_4$ or $Li_xMnO_2$) may be named as a positive electrode active material with the upper limit: of the operation potential with reference to Li of less than 4.0 V, when this predetermined value is 4.0 V, Furthermore, for example, lithium cobalt composite oxide ($Li_xCoO_2$) and lithium nickel cobalt manganese composite oxide (NMC, ternary, $LiNi_xCo_yMn_{1-y-z}O_2$) may be named as a positive electrode active material with the upper limit of the operation potential with reference to Li of less than 3.8

V. when this predetermined value is 3.8 V. Moreover, for example, LiFePO$_4$ may be named as a positive electrode active material with the upper limit of the operation. potential with reference to Li of less than 3.6 V, when this predetermined value is 3.6 V.

In particular, when the positive electrode current collector 12 is formed of aluminum, it is preferable to select a positive electrode active material with the upper limit of the operating potential with reference to Li of less than the predetermined value. If the operating potential of the positive electrode active material with reference to Li is 4.2 V or higher, a positive electrode current collector 12 formed of aluminum is relatively easily corroded in the course of charging/discharging. For this case, for example, LiFePO$_4$, which has an upper limit of the operating potential with reference to Li of less than 3.6 V, may be selected as the positive electrode active material.

The positive electrode binder may be one or more binders which are used as a negative or positive electrode binder in conventional lithium ion secondary batteries and which have a relative energy difference (RED) value relative to the electrolytic solution 40 greater than one. The RED value is based on Hansen Solubility Parameter (HSP), as described later. For example, the negative and positive electrode binders of a conventional lithium ion secondary battery may be polyvinylidene fluoride [PVdF], polytetrafluoroethylene [PTFE], polyvinylpyrrolidone [PVP], polyvinyl chloride [PVC], polyethylene [PE], polypropylene [PP], ethylene-propylene copolymer, styrene butadiene rubber [SBR], acrylic resin, or polyacrylic acid.

The positive electrode binder has a RED value greater than one, which is based on HSP, with respect to the electrolytic solution 40. Thus, the positive electrode binder exhibits poor solubility in the electrolytic solution 40. The HSP was made public by Dr. Charles M. Hansen. This parameter is known as a solubility index and indicates how soluble a substance is in another substance. For example, water generally does not dissolve in oil due to a difference between the "characteristics" of water and oil. The HSP indicates the "characteristics" of a substance's solubility by using a dispersion term D, a polar term P, and a hydrogen bonding term H for each substance, each as a numerical value. The dispersion term D shows a strength of van der Waals forces. The polar term P shows a size of the dipole moment. The hydrogen bonding term H shows the strength of hydrogen bonding. The basic idea of how this is applied is described below. Thus, the explanation of dividing the hydrogen bonding term H into a donor property and an acceptor property is omitted.

The Hansen solubility parameters (D, P, and H) are plotted in a three-dimensional orthogonal coordinate system (Hansen space, HSP space) to consider solubility. For example, a solution A and a solid B can be plotted in the Hansen space as a pair of points (point A, point B) according to the Hansen solubility parameters of the solution A and the solid B. The shorter the distance $R_a$, (HSP distance, $R_a$) between points A and B, the more similar the "characteristic" of the solution A and the solid B. Accordingly, the solid B can be considered to be more readily soluble in the solution A. Conversely, the longer the distance $R_a$, the more dissimilar the "characteristics" of the solution A and the solid B. Thus, one can consider that it would be difficult to dissolve the solid B in the solution A.

The distance $R_a$ may have a boundary at which a substance is considered to transition between a soluble substance and an insoluble substance. This boundary is defined as an interaction radius $R_0$. Thus, regarding the solution A and the solid B, when the distance $R_a$ is shorter than the interaction radius $R_0$ ($R_a<R_0$), the solid B can be considered to be soluble in the solution A. On the other hand, when the distance $R_a$ is longer than the interaction radius $R_0$ ($R_0<R_a$), the solid B can be considered to be insoluble in the solution A. A RED value ($R_a/R_0$, Relative Energy Difference) is defined as the distance $R_a$ divided by the interaction radius $R_0$. When the RED value is less than one (RED=$R_a/R_0$<1), the distance $R_a$ is smaller than the interaction radius $R_0$. Thus, the solid B can be considered to be soluble in the solution A. On the other hand, when the RED value is greater than one (RED=$R_a/R_0$>1), the distance $R_a$ is greater than the interaction radius $R_0$) . Thus, the solid B can be considered to be insoluble in the solution A. In this way, it is possible to judge whether the solid B can be dissolved in the solution A based on the RED value of the solution A and the solid B.

In this disclosure, the electrolytic solution 40 corresponds to the solution A, and the positive electrode binder corresponds to the solid B. The positive electrode binder has a RED value of greater than 1, with regard to the Hansen solubility parameter, with regards the electrolytic solution 40. Thus, the positive electrode binder exhibits poor solubility in the electrolytic solution 40. Said another way, if the positive electrode binder exhibits poor solubility in the electrolytic solution 40, the positive electrode binder can be considered to have the RED value greater than 1.

The Hansen solubility parameter and the interaction radius $R_0$ can be calculated by using the chemical structures and composition ratio of components and/or experimental results. In that case, the software HSPiP (Hansen Solubility Parameters in Practice: Windows® software for efficiently handling HSP) can be used to calculate the parameters. HSPiP is available at http://www.hansen-solubility.com/ at present (May 2, 2018). Even for a mixture of multiple solvents, the Hansen solubility parameters (D, P, and H) can be calculated.

<2-2. Negative Electrode Plate 21 (FIGS. 1, 3, 6, and 7>

A negative electrode plate 21 according to this embodiment may have a composition generally similar to that of the above-described positive electrode plate 11. That is, the negative electrode plate 21 may have a thin plate-shaped negative electrode collector 22 and a negative electrode active material layer 23 coating the negative electrode collector 22. The negative electrode active material layer 23 may be coated on one of either surface or on both surfaces of the negative electrode collector 22. The negative electrode active material layer 23 coated on the negative electrode collector 22 needs to be sufficiently dried after coating so that the lithium ion secondary battery 1 do not contain excessive moisture. As described later, the negative electrode active material layer 23 is pre-doped with lithium ions Li$^+$ at the time of manufacturing.

Figure 6:
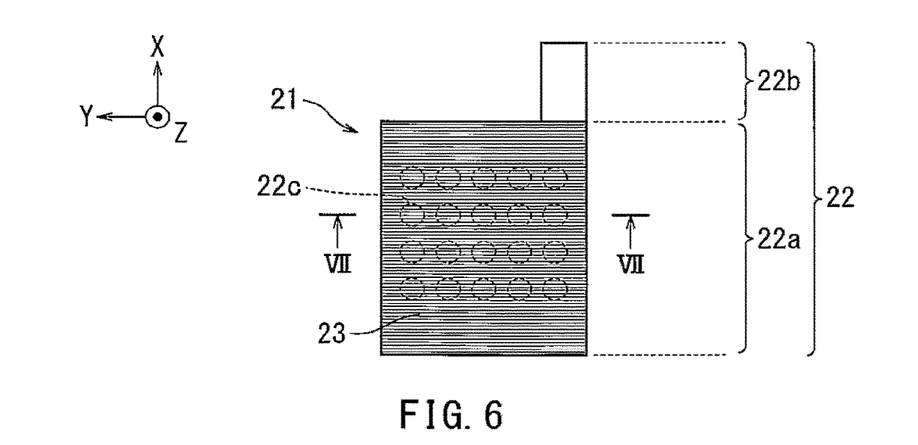
FIG. 6 is a view illustrating an example of the appearance of a negative electrode plate shown in FIG. 1.
Figure 7:
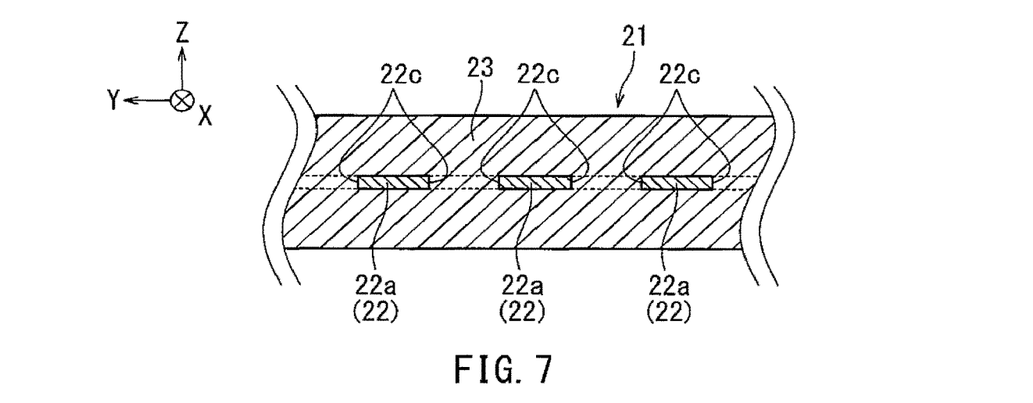
FIG. 7 is a cross-sectional view of the negative electrode plate, taken along line VII-VII of FIG. 6.

The negative electrode collector 22 is a metallic foil having holes 22$c$ extending therethrough it Z direction, similar to the above-described holes 12$c$ of the positive electrode current collector 12 of the positive electrode plate 11 (see FIGS. 6 and). A rectangular-shaped current collecting portion 22$a$ and an electrode terminal connecting portion 22$b$ projecting outwardly from one end of the current collecting portion 22$a$ (right end of an upper side in FIG. 6) are integrally formed. Although the current collecting portion 22$a$ has the holes 22$c$, the electrode terminal connecting portion 22$b$ may or may not have holes like the holes 22$c$ of the current collecting portion 22$a$. Since the current collecting portion 22$a$ has the holes 22$c$, positive ions and negative ions included in the electrolytic solution 40 can be transmitted through the current collecting portion 1.2a of the positive electrode current collector 1.2, It is possible that the current collecting portion 22a of the negative electrode collector 22 does not have holes 22c, and the electrode terminal connecting portion 22b of the negative electrode collector 22 does not have any holes like the holes 22c of the current collecting portion 22a.

As illustrated in FIG. 1. the electrode terminal connecting portion 12b of the positive electrode plate 11 and the electrode terminal connecting portion 22b of the negative electrode plate 21 are disposed apart from each other in a surface direction of the negative electrode plate 21 so that they do not directly overlap each other. The width in the axis direction of the electrode terminal connecting portion 22b, which is shown in FIGS. 1 and 6, may be properly changed, for example, to be the same width as the current collecting portion 22a. The negative electrode collector 22 may be formed of a metallic foil comprised of for example, aluminum, stainless steel, and/or copper, similar to the positive electrode current collector 12 of the positive electrode plate 11.

Similar to the positive electrode active material layer 13, the negative electrode active material layer 23 includes a negative electrode active material capable of storing and releasing lithium ions and includes a negative electrode binder capable of binding the negative electrode active materials and binding to the current collecting . portion 22a of the negative electrode collector 22. Further, the negative electrode active material layer 23 is configured to store and release lithium ions due to the negative electrode active materials contained therein. Further, the negative electrode active material layer 23 may include a conductive assistant to increase the electrical conductivity of the negative electrode active material layer 23, thickening materials to allow for easy manufacturing of the negative electrode plates 21, and/or other such materials. The conductive assistant may be made of the same materials as that used for the positive electrode plates 11 described above. That is, examples of the conductive assistant include Ketjenblack, acetylene black, small particulate of graphite, fine fiber of graphite, etc. An example of the thickening materials is carboxyl methyl cellulose [CMC], etc.

The negative electrode active material may be one or ore materials which are used as a negative electrode active material in the conventional lithium ion secondary batteries and which are capable of storing and releasing lithium ions. Examples of the negative electrode active materials are carbon materials such as black lead, metal oxides such as tin oxides and silicon oxides, materials that are reformed by adding phosphorus and boron in order to increase negative electrode property, or other such materials. Further, another example of the negative electrode active material is lithium titanate with a spinet-type structure, shown by a formula $Li_{4+x}Ti_5O_{12}(0 \leq x \leq 3)$. Further, some of Ti atoms may be replaced with Al atoms and/or Mg atoms. Further, still other examples of the negative electrode active material are silicon materials such as silicon, silicon alloys, SiO, and silicon composite materials. Such materials may be used alone or as a mixture of two or more.

The negative electrode binder may be one or more binders used as a positive electrode or negative electrode binder in conventional lithium ion secondary batteries. Examples of the binders used in conventional lithium ion secondary batteries include polyvinylidene fluoride [PVdF], polytetrafluoroethylene [PTFE], polyvinylpyrrolidone [PVP], polyvinylchloride [PVC], polyethylene [PE], polypropylene [PP], ethylene-propylene copolymers, styrene-butadiene rubber [ISBR], acrylic resins, and polyacrylic acid. These binders may also be used as the positive electrode binder of the lithium ion secondary battery 1.

Lithium ions $Li^+$ are introduced in the negative electrode active material large (pre-doped) at the time of manufacture.

Pre-doping may basically be performed by one of at least the following two methods. In one method, as shown in FIG. 1, a plurality of positive electrode plates 11, a plurality of negative electrode plates 21, and a plurality of separators 30 are layered. The layered structure is then placed in an interior (FIG. 2) of a laminate member 50 and an electrolytic solution 40 is added before pre-doping is performed. That is, the pre-doping may be performed within the interior of the laminate member 50, in the other method of the two, lithium ions $Li^+$ are introduced into the negative electrode active materials before the negative electrode plates 21 are formed. That is, the pre-doping may be performed exterior of the laminate member 50.

The method in which the pre-doping is performed within the interior of the laminate member 50 include two methods, a chemical and an electrochemical method. In the method in which the pre-doping is performed within the interior of the laminate member 50, the plurality of positive electrode plates 11, the plurality of negative electrode plates 21, the plurality of separators 30, and the electrolytic solution 40 are placed in the interior (FIG. 2) of the laminate member 50 before the pre-doping is performed. In the chemical method, metal lithium is dissolved in the electrolytic solution 40 to produce lithium ion $Li^{30}$, so as to allow the lithium ions $Li^+$ to be stored in the negative electrode active materials. Conversely, in the electrochemical method, metal lithium and the negative electrode plates 21 have a voltage applied to them to produce lithium ion $Li^+$ from metal lithium, so as to allow the lithium ions $Li^+$ to be stored in the negative electrode active materials.

In each of the chemical method and the electrochemical method, it is preferable that lithium ions $Li^+$ can pass through the collecting portions 12a (see FIG. 5) of the positive electrode collectors 12 of the positive electrode plates 11 and the collecting portions 22a(see FIG. 7) of the negative electrode collectors 22 of the negative electrode plates 21, such that lithium ions $Li^{30}$ can easily diffuse within the electrolytic solution 40. Therefore, for the pre-doping to be performed by the chemical method and the electrochemical method, a plurality of holes 12c may preferably be formed in the collecting portions 12a of the positive electrode collectors 12. Further, a plurality of holes 22c may preferably be formed in the collecting portions 22a (see FIG. 7) of the negative electrode collectors 22.

In the method in which the pre-doping is performed exterior of the laminate member 50, lithium ions $Li^+$ are introduced into the negative electrode active materials before the negative electrode plates 21 are formed. Therefore, lithium ions $Li^+$ need not be diffused within the electrolytic solution 40 in order to perform the pre-doping. Therefore, when the pre-doping is performed exterior of the laminate member 50, it is not necessary to form the plurality of holes 12c in the collecting portions 12a of the positive electrode collectors 12. Similarly, it is not necessary to form the plurality of holes 22c in the collecting portions 22a (see FIG. 7) of the negative electrode collectors 22.

Further, the method in which the pre-doping is performed interior of the laminate member 50 may be used in combination with the method in which the pre-doping may be performed exterior of the laminate member 50, as necessary. After pre-doping has been performed exterior of the laminate member 50, the plurality of positive electrode plates 11, the plurality of negative electrode plates 21 and the plurality of separators 30 may be placed within the interior (see FIG. 2) of the laminate member 50 with the electrolytic solution 40. Subsequently, an additional pre-doping may be performed interior of the laminate member 50 using the chemical method or the electrochemical method.

<2-3 Separators 30 (FIGS. 1 and 3)>

As shown in FIG. 1, the separators 30 may be configured to separate the positive electrode plates 11 and the negative electrode plates 21. The separators 30 may be made of a porous material that allow cations and anions contained within the electrolytic solution 40 to pass therethrough. Each of the separators 30 may be formed into a rectangular sheet shape. The vertical and lateral sizes of each of the separators 30 (see FIGS. 1 and 3) is configured to be greater than the length of each the collecting portions 12a (see FIG. 4) of the positive electrode collectors 12 of the positive electrode plates 11 and greater than the length of the collecting portions 22a (see FIG. 6) of the negative electrode collectors 22 of the negative electrode plates 21. The separators 30 may be separators that are used in conventional lithium ion secondary batteries. Examples of the separators 30 include paper made of viscose rayon and native cellulose and non-woven fabric made of polyethylene, polypropylene, etc.

<2-4. Electrolytic Solution 40>

The electrolytic solution 40 may contain an organic solvent (non-aqueous solvents) and an imide-based lithium salt as the electrolyte. The electrolytic solution 40 may additionally contain additives, as necessary. Examples of the additives include vinylene carbonate [VC], fluoroethylene carbonate [FEC], ethylene sulfide [ES], or other such compositions that may accelerate production of an SEI film (Solid Electrolyte Interface Film) on the negative electrode.

The organic solvents may be organic solvents having heat resistance at least up to 85° C. Examples of the organic solvents include carbonate-based organic solvents, nitrile-based organic solvents, lactone-based organic solvents, ether-based organic solvents, alcohol-based organic solvents, ester-based organic solvents, amid-based organic solvents, sulfone-based organic solvents, ketone-based organic solvents, and aromatic organic solvents. These organic solvents may be used alone or as a mixture of solvents in which two or more solvents are mixed at a ratio. Further, examples of carbonate-based organic solvents include cyclic carbonate such as ethylene carbonate [EC], propylene carbonate [PCI], and chain carbonate such as fluoroethylene carbonate [FEC], ethyl methyl carbonate [EMC], diethyl carbonate [DEC], and dimethyl carbonate [DMCI]. However, the organic solvent preferably does not contain dimethyl carbonate [DMC], which is a one chain carbonate. The dimethyl carbonate [DMC] may, rarely, cause a deterioration in heat resistance.

Examples of the nitrile-based organic solvent include acetonitrile, acrylonitrile, adiponitrile, valeronitrile, and isobutyronitrile. Further, examples of the lactone-based organic solvent include gamma-butyrolactone and gamma-valerolactone. Examples of the ether-based organic solvent include cyclic. ethers, such as tetrahydroftuan and dioxane, chain ether, such as 1,2-dimethoxyethane, dimethyl ether, and triglyme. Examples of the alcohol-based organic solvent include ethyl alcohol and ethylene glycol. Examples of the ester-based organic solvent include methyl acetate, propyl acetate, phosphoric acid esters, such as trimethyl phosphate, sulfuric acid esters, such as dimethyl sulfate, and sulfite esters, such as dimethylsulfites. Examples of the amide-based organic solvent include N-methyl-2-pyrrolidone and ethylenediamine. Examples of the sulfone-based organic solvent include chain sulfones, such as dimethyl sulfone, and cyclic sulfones, such as 3-sulfyiene. Example of the ketone-based organic solvent and aromatic organic solvent respectively include methyl ethyl ketone and toluene. The various organic solvents, except for the carbonate-based organic solvent, may preferably be used with a cyclic carbonate, in particular, with ethylene carbonate [EC], capable of producing an SEI film (Solid Electrode Interface Film) on the negative electrode. In this case, the positive electrode binder and the negative electrode binder are preferably polyacrylic acid. The organic solvent may preferably contain ethyl methyl carbonate [EMC] and diethyl carbonate [DEC].

The electrolyte may be an imide-based lithium salt (a lithium salt having [—$SO_2$—N—$SO_2$—] as a partial structure). Here, examples of the imide-based lithium salt include lithium bis(fluorosulfonyl)imide [$LiN(FSO_2)_2$, LiFSI], ;lithium bis(triflouromethanesulfonyl)imide [$LiN(SO_2CF_3)_2$, LiTFSI], and lithium bis(pentafluoroethanesulfonyl)imide [$LiN(SO_2CF_2CF_3)_2$, LiBETI]. These inside-based lithium salts may be used alone or as a mixture of two or more. These imide-based lithium salts have heat resistance at 85° C. Among these salts, an imide-based lithium salt (for example, lithium bis(fluorosulfonyl)imide [$LiN(FSO_2)_2$, LiFSI]) that does not have a trifluoromethane group (—$CF_3$), a pentafluoroethane group (—$CF_2CF_3$), or a pentafluorophenyl group (—$C_6F_5$) may preferably be used because the positive electrode binder and the negative electrode binder may tend to have a RED value based on Hansen solubility parameter greater than 1 with respect to such an imide-based lithium salt. In addition, the ionic conductivity of the electrolyte 40 is less likely to decrease at high or low temperature. As a result, the electrolyte 40 may be stabilized.

The concentration of the electrolyte contained in the electrolytic solution 40 may preferably be 0.5-10.0 mol/L. In view of an appropriate degree of viscosity and the ionic conductivity of the electrolyte 40, the concentration of the electrolyte contained in the electrolytic solution 40 may preferably be 0.5-2.0 mol/L. Concentrations less than 0.5 mol/L are not appropriate because the ion conductivity of the electrolyte 40 is excessively reduced due to a decrease in the concentration of ions dissociated by the electrolyte. On the other hand, concentrations greater than 10.0 mol/L are also not appropriate because the ion conductivity of the electrolyte 40 is excessively reduced due to an increase in the viscosity of the electrolyte 40. Therefore, such an increased concentration of the electrolyte. Further, when the electrolytic solution 40 contains the organic solvent and the electrolyte described above, it is preferable that the positive electrode binder and the negative electrode binder are polyacrylic acid.

<2-5, Laminate Member 50 (FIGS. 1 and 3)>

As shown in FIG. 3, the laminate member 50 includes a core material sheet 51, an outer sheet 52, and an inner sheet 53. The outer sheet 52 is bonded to the outer surface of the core material sheet 51, and the inner sheet 53 is bonded to the inner surface of the core material sheet 51. For example, the core material sheet 51 may be an aluminum foil, the outer sheet 52 may be a plastic sheet, such as a nylon PET film, and the inner sheet 53 may be a plastic sheet, such as a polypropylene.

<3. Charging Discharging Process of the Lithium Ion Secondary Battery 1 (FIGS. 3, 8, and 9)>

Figure 8:
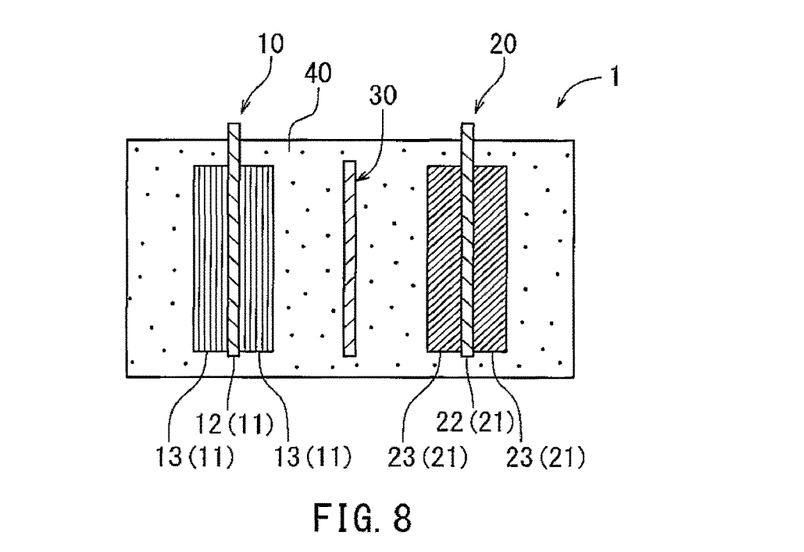
FIG. 8 is a diagram illustrating a positional relationship between the positive electrode plate of a positive electrode, the negative electrode plate of a negative electrode, a separator, and the electrolyte shown in FIG. 1.

FIG. 8 schematically shows the positional relationship among the positive electrode plate 11 of the positive electrode 10, the negative electrode plate 21 of the negative electrode 20, the separator 30, and the electrolytic solution 40 of the lithium ion secondary battery (see FIG. 1). As shown in FIG. 8, the lithium ion secondary battery 1 includes the positive electrode plate 11 and the negative electrode plate 21 that counter with each other with the separator 30 interposed therebetween. As described above, both the positive electrode active material layer 13 and the negative electrode active material layer 23 are configured to be able to store and release lithium ions $Li^+$.

Figure 9:
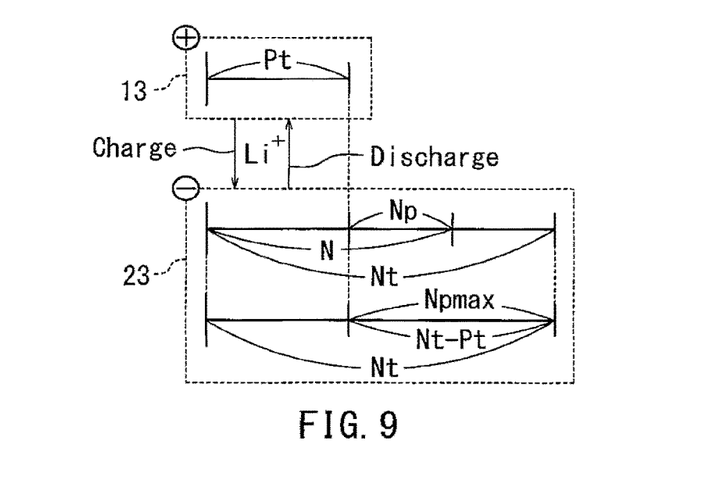
FIG. 9 is a diagram illustrating an upper limit of the pre-doping amount of the negative electrode.

In the lithium ion secondary battery 1 during charging, the lithium ions $Li^+$ stored in the positive electrode active material layer 13 are released into the electrolyte 40, and the same amount of the lithium. ions $Li^+$ in the electrolyte 40 are stored into the negative electrode active material layer 23 (see FIGS. 8 and 9). In contrast, in the lithium ion secondary battery 1 during discharging, the lithium ions $Li^+$ stored in the negative electrode active material layer 23 are released into the electrolyte 40 and the same amount of the lithium ions $Li^+$ in the electrolyte 40 are stored into the positive electrode active material layer 13. in the course of charging and discharging, lithium ions $Li^+$ move between the positive electrode active material layer 13 and the negative electrode active material layer 23 via the electrolyte 40 (see FIGS. 8 and 9). That is, lithium ions $Li^+$ move from the positive electrode active material layer 13 toward the negative electrode active material layer 23 during charging, and move from the negative electrode active material layer 23 toward the positive electrode active material layer 13 during discharging via the electrolyte 40 (FIG. 8 and FIG. 9). The maximum amount of lithium ions $Li^+$ stored in the negative electrode active material layer 23 is achieved at full charge during the charging/discharging process. The amount of the lithium ions $Li^+$ stored in the positive electrode active material layer 13 and the negative electrode active material layer 23 changes as lithium ions $Li^+$ are stored or released during the charging/discharging process, as described above. In this specification, the amount of lithium ions $Li^+$ may be a value proportional to the number of atoms of the lithium for example, the number of moles.

<4. Pre-doping>

Although the lithium ions $Li^+$ are pre-doped in the negative electrode active material layer 23, an upper limit value may be set for the amount of lithium ions $Li^+$ to the pre-doped as will be described below.

When transitioning from the completely discharged state to the fully charged state, lithium ions $Li^+$ are me stored into the negative electrode active material layer 23 in the same amount as the amount $P_1$ of the lithium ions $Li^+$ that were stored in the positive electrode active material layer 13 at complete discharge (see FIG. 9). The amount N of the lithium ions $Li^+$ to be stored in the negative electrode active material layer 23 at full charge is the sum $N_p+P_t$, which is the sum of the amount $P_t$ of the lithium ions apparently moving from the positive electrode active material layer 13 to the negative electrode active material layer 23 and the amount $N_p$ of the lithium ions $Li^+$ introduced into the negative electrode active material layer 23 by pre-doping (see FIG. 9). $P_t$ is the amount of the entire lithium ions $Li^+$ stored in the positive electrode active material layer 13 at full discharge. If some lithium ions $Li^+$ are changed into inactive compounds in the course of charging and discharging, they can be compensated for by lithium ions $Li^+$ introduced into the negative electrode active material layer 23 during pre-doping. Therefore, $P_t$ will be the same amount as the amount of lithium ions $Li^+$ that were stored in the positive electrode active material layer 13 before the initial charging (that is, the amount of lithium ions $Li^+$ stored in the positive electrode active material before manufacture).

The amount of lithium ions $Li^+$ that can possibly be stored in the non-predoped negative electrode active material layer 23 is denoted by $N_t$ (see FIG. 9). As described above, at full charge, the amount N of lithium ions $Li^+$ stored in the negative electrode active material layer 23 is $N_p+P_t$ (that is, the sum of the amount $N_p$ of the lithium ions $Li^+$ introduced into the negative electrode active material layer 23 due to pre-doping and the amount $P_t$ of the lithium ions $Li^+$ apparently moving from the positive electrode active material layer 13 to the negative electrode active material layer 23 when transitioning from the completely discharged to fully charged state (see FIG. 9).

If the pre-dope amount $N_p$ of lithium ions $Li^+$ would cause the amount N ($=N_p+P_t$) of the lithium ions $Li^+$ stored in the negative electrode active material layer 23 at the time of full charge to exceed the amount $N_t$ of the lithium ions $Li^+$ that could be stored in the non-predoped negative electrode active material layer 23 (i.e. $N_p+P_t>N_t$), the excess amount (that is, $N_p+P_t-N_t$) cannot be stored in the negative electrode active material layer 23. Therefore, the excess amount may precipitate from the electrolytic solution as metallic lithium. Therefore. the upper limit of $N_{pmax}$ of the amount $N_p$ of lithium ions $Li^+$ introduced into the negative electrode active material layer 23 by pre-doping is set so that $N_{pmax}=N_1-P_t$. As a result, $N_p+P_t \leq N_t$ is satisfied, and the lithium ions $Li^+$ released from the positive electrode active material layer 13 can be accommodated by the negative electrode active material layer 23. This suppresses precipitation of the lithium ions $Li^+$, $N_{pmax}$, $N_1$, and $P_t$ can be represented by the number of moles, or the like.

As described above, $P_t$ is the amount of lithium ions $Li^+$ that were stored in the positive electrode active material layer 13 before the initial charging (that is, the amount of lithium ion $Li^+$ stored in the positive electrode active material before production). Therefore, the upper limit value $N_{pmax}$ of the amount of lithium ions $Li^+$ that can be introduced into the negative electrode active material layer 23 by pre-doping is the maximum amount of lithium ions $Li^+$ that could be stored in the non-predoped negative electrode active material layer 23 $N_t$ minus the amount of lithium ions $Li^+$ that were stored in the positive electrode active material before production ($P_t$). $N_t$ and $P_t$ can be determined from, for example, the theoretical values of the positive electrode active material and the negative electrode active material, or from experimentally obtained measurements of the amount of lithium ion $Li^+$ that could be stored in the non-predoped negative electrode active material and the amount of lithium ion $Li^+$ that are stored in the positive electrode active material.

As described above, the upper limit value of the amount; $N_p$ of lithium ions $Li^+$ that should be introduced into the negative electrode active material layer 23 by pre-doping is $N_{pmax}=N_t-P_t$. Therefore, varies depending on the value of N and the value of $P_t$ (see FIG. 9). Roughly speaking, $N_{pmax}$ increases as the value of N, increases, and $N_{pmax}$ decreases as the value of $P_t$ increases (see FIG. 9). For example, when $N_t$ is two times as large as $P_t$ (i.e., $N_t=2 \cdot P_t$), is equal to $P_t$ (see FIG. 9). For example, when $N_t$ is 3 times as large as $P_t$ (i.e., $N_t=3 \cdot P_t$), $N_{pmax}$ is equal to 2 times as large as $P_t$ (i.e., $2 \cdot P_t$) (see FIG. 9). Thus, $N_{pmax}$ varies depending on the value of $N_t$ and the value of $P_t$ (see FIG. 9). That is, the upper limit value $N_{pmax}$ of the amount $N_p$ of lithium ions $Li^+$ that are to be introduced into the negative electrode active material layer 23 by pre-doping varies depending on the amount $N_t$ of lithium ions $Li^+$ that could be stored in the non-predoped negative electrode active material layer 23 and the amount $P_t$ of lithium ions $Li^+$ stored in the positive electrode active material layer 13 before charging/discharging.

Further, as described above, setting the upper limit $N_{pmax}$ of the amount $N_p$ of lithium ions $Li^+$ to be introduced into the negative electrode active material layer 23 by pre-doping to $N_{pmax}=N_t-_t$ can be rephrased as follows. The amount of lithium ions $Li^+$ stored in the negative electrode active material layer 23 reaches the maximum at full charge during the charging/discharging process. As described above, the amount N of lithium ions $Li^+$ stored in the negative electrode active material layer 23 at full charge is equal to the amount $P_t$ of all the lithium ions $Li^+$ stored in the positive electrode active material layer 13 at full discharge plus the amount $N_p$ of lithium ion $Li^+$ introduced into the negative electrode active material layer 23 by pre-doping, $N_p+P_t$ (i.e., $N=N_p+P_t$) (see FIG. 9). When the amount $N_p$ of lithium ions $Li^+$ introduced into the negative electrode active material layer 23 by pre-doping is at the upper limit $N_{pmax}$ ($N_o=N_{pmax}=N_t-P_t$), the amount N of lithium ions $Li^+$ stored in the negative electrode active material layer 23 at full charge ($=N_p+P_t$) is $N_p+P_t=N_t-P_t$O$+P_t=N_t$.

The amount N of the lithium ions $Li^+$ stored in the negative electrode active material layer 23 at full charge (see FIG. 9) is represented as a percentage (%) of the amount $N_t$ of the lithium ions $Li^+$ that could be stored in the non-predoped negative electrode active material layer 23. N is 100% when $N=N_t$. As described above, when the amount $N_p$ of lithium ions $Li^+$ introduced into the negative electrode active material layer 23 during the pre-doping process reaches its upper limit $N_{pmax}$ ($N_p=N_{pmax}=N_t-P_t$). the amount N of the lithium ions $Li^+$ stored in the negative electrode active material layer 23 at fall charge becomes $N=N_t$ and therefore, N=100%. Further, as described above, the maximum amount of lithium ions $Li^+$ stored in the negative electrode active material layer 23 is $N(=N_p+P_t)$ at full charge. Therefore, when the amount $N_p$ of the lithium ions $Li^+$ introduced into the negative electrode active material layer 23 by pre-doping is the upper limit $N_{max}$ ($N_p=N_{pmax}=N_t-P_t$), the amount of lithium ions $Li^+$ stored in the negative electrode active material layer 23 at full charge is N=100% at the maximum, and does not exceed 100%. That is, the amount of the lithium ions $Li^+$ to be introduced into the negative electrode active material layer 23 during the pre-doping process is always adjusted to be 100% or less of the amount $N_t$ of lithium ions $Li^+$ that could be stored in the non-predoped negative electrode active material layer 23 in the course of charging and discharging. This is done by setting an upper limit $N_{pmax}$ ($=N_t-P_t$) for the amount $N_p$ of the lithium ions $Li^+$ to be introduced into the negative electrode active material layer 23 during pre-doping. The doping rate of the negative electrode active material in the negative electrode active material layer may be represented as follows:

Doping ratio (%)=$N/N_t\times100$

N: Amount (moles) of lithium ions stored in the negative electrode active material (negative electrode active material layer) at full charge.

$N_t$: Amount (moles) of lithium ions that could be stored in the non-predoped negative electrode active material (negative electrode active material layer).

[Other Embodiments]

As another embodiment, for example, the above-mentioned lithium ion secondary battery is a laminated lithium ion secondary battery in which a positive electrode plate 11, a negative electrode plate 21, and a separator 30 are laminated, but they are configured as a long positive electrode and a long positive electrode are used. This configuration can be configured as a wound type lithium ion secondary battery, in which a long negative electrode and a long separator are wound.

The lithium ion secondary battery may be a lithium polymer secondary battery.

<<About the Heat Resistance of Lithium-ion Secondary Batteries>>

With the configuration described above, the lithium ion secondary battery 1 has heat resistance at 85° C.

When a conventional lithium ion secondary battery is maintained at about 85° C. the lithium ions $Li^+$ may gradually change to an inactive compound. As a result, the amount of lithium ions $Li^+$ which can participate in charge/discharge may gradually decrease, thereby causing the charge/discharge capacity may gradually decrease. Such a lithium ion secondary battery may have a reduced charge/discharge capacity at a high temperature, that is, they may have poor high temperature durability. In the present disclosure, a high temperature durability means that the charge/discharge capacity of the lithium ion secondary battery is maintained at a sufficient amount, even if the lithium ion secondary battery remains at a high temperature for a long time.

On the other hand, in the lithium ion secondary battery 1 of the present embodiment, the negative electrode active material is pre-doped, with lithium ions that is, the lithium ions $Li^+$ are stored in advance in the negative electrode active material. Therefore, even if some of the lithium ions $Li^+$ required for charging and discharging change to an inactive compound, the lithium ions $Li^+$ introduced in the negative electrode active material during the pre-doping process may compensate for the change. As a result, a decrease in charge/discharge capacity of the lithium ion secondary battery 1 may be suppressed. Therefore, the lithium ion secondary battery 1 not only has heat resistance at 85° C., but also has great high temperature durability.

When the lithium ion secondary battery is used for a long time in a high temperature environment, the discharge capacity may decrease and the internal resistance may increase. However, as the dope rate increases, the rate of decrease in discharge capacity and the rate of increase in internal resistance tend to be lower. Therefore, the dope ratio is preferably 50% to 100%, more preferably 80%, to 100%, and even more preferably 90% to 100%.

The lithium ion secondary battery of the present disclosure is not limited to the structure, configuration, appearance, shape, and/or the like described in the above-described embodiment. Various modifications, additions, and/or deletions may be made by understanding the above-described embodiment.

Hereinafter, the arts of the present disclosure will be described in more detail with reference to examples. However, the arts of the present disclosure are not limited to these examples.

<Preparation of Lithium Ion Secondary Battery>

[Preparation of Positive Electrode]

First, 88 parts by mass of $LiFePO_4$ as the positive electrode active material. 6 parts by mass of polyacrylic acid (a sodium neutralized salt of polyacrylic acid) as the binder, 15 parts by mass of carbon black as the conductive aid, and carboxymethyl cellulose as the thickener were prepared. A positive electrode slurry containing the positive electrode active material was prepared using 0.3 parts by mass and 217 parts by mass of water as the solvent.

The positive electrode slurry was prepared by the following procedure.

(1) All the materials and water were mixed with Mixer A (Awatori Rentaro ARE-310, produced by Thinky Corporation) to prepare a pre-slurry.
(2) The pre-slurry obtained in (1) was further mixed with Mixer B (Filmix 40-L, produced by Primix Corporation) to prepare an intermediate slurry.
(3) The intermediate slurry obtained in (2) was mixed again with Mixer A to prepare a slurry for a positive electrode.

Next, an aluminum foil (porous foil) having a thickness of 15 μm was used as the current collector foil, and each positive electrode slurry was applied on the current collector foil. They were then dried to prepare a positive electrode. The amount of the positive electrode slurry applied was adjusted so that the mass of the activated carbon after drying was 3 mg/cm². A blade coater or a die coater was used to apply the positive electrode slurry to the current collector foil.

[Preparation of Negative Electrode]

98 parts by mass of graphite as the negative electrode active material, 1 part by mass of styrene-butadiene rubber (SBR) as the binder, 1 part by mass of carboxymethyl cellulose as the thickening material, and 96 parts by mass of water as the solvent were mixed to prepare a slurry for a negative electrode according to the following procedure.
(1)The materials, excluding the binder, and water were mixed with Mixer A to prepare a pre-slurry.
(2) The pre-slurry obtained in (1) was further mixed with Mixer B to prepare an intermediate slurry.
(3) The binder was added to the intermediate slurry obtained in (2), and mixed with Mixer A to prepare a slurry for a negative electrode.

Next, using a copper foil (porous foil) having a thickness of 10 μm as the current collector foil, the negative electrode slurry was coated to the current collector foil. There were then dried to prepare the negative electrodes. The amount of the negative electrode slurry coated was adjusted so that the mass of graphite after drying was 3 mg/cm². A blade coater was used to coat the negative electrode slurry on the current collector foil.

[Preparation of Electrolytic Solution]

A mixed solvent containing 20.0 vol % of ethylene carbonate [EC], 10.0 vol % of propylene carbonate [PC], 46.7 vol % of ethyl methyl carbonate [EMC], and 23.3 vol % of diethyl carbonate [DEC]. Lithium bis(fluorosulfonyl)imide [$LiN(FSO_2)_2$. LiFSI], which is an imide-based lithium salt, was added as the electrolyte. The electrolytic solution contains 1.0 mol/l of LiFSI.

[Assembly of the Lithium Ion Secondary Battery]

A lithium ion secondary battery was prepared according to the following procedure.
(1) The positive electrode and the negative electrode were punched out to form a rectangle having a size of 60 mm×40 mm. Then, an area of 20 mm×40 mm of the coating in the region on one end of the long side was peeled off, leaving the coating having a size of 40 mm×40 mm. The current collecting tab was then attached.
(2) A laminate was prepared by arranging the coating portions of the positive electrode and the negative electrode to face each other and interposing a cellulose separator having a thickness of 20 μm therebetween.
(3) The laminate prepared in (2) and a metallic lithium foil for lithium pre-doping were encapsulated in an aluminum laminate foil. An electrolytic solution was injected into the aluminum foil. The aluminum foil was then sealed to prepare a lithium ion secondary battery. When the RED value of the positive electrode binder with respect to the electrolytic solution was calculated, it was confirmed that it was larger than 1.

The above lithium ion secondary battery was pre-doped to prepare the lithium ion secondary battery of Example 1. According to literature values, the amount of lithium ions $Li^+$ stored in the positive electrode active material of the positive electrode active material layer is 0.0010 mol, and the maximum amount of lithium ion $Li^+$ that can be stored in the negative electrode active material layer is 0.0030 mol. In the pre-doping process, 0.0015 mol of lithium ions $Li^+$ were introduced into the negative electrode active material layer by dissolving 0.0102 g of metallic lithium in the electrolytic solution. The lithium ion secondary battery of Example 2 is different from the lithium ion secondary battery of Example 1 only in that the lithium ion secondary battery of Example 2 is not pre-doped, The following tests were performed using the lithium ion secondary batteries of Examples 1 and 2.

[Battery Performance Test]

The internal resistance and discharge capacity of the lithium ion secondary battery were measured at room temperature (25° C.) at a cutoff voltage of 3.0 to 3.5 V, a measurement current of 5 mA, and 0.2 C. The internal resistance was measured by the DC-IR method, and the internal resistance (mΩ) at 0 to 0.1 sec was measured.

[Durability Test (8.5° C. float test)]

A lithium ion secondary battery cell was connected to an external power supply to maintain the voltage at 3.5 V and was placed in a constant temperature bath of 8.5° C. for a certain time, which is referred to as the 85°C. and 3.5 V float time. After the lapse of this time, the lithium ion secondary battery cell was taken out of the constant temperature bath and returned to be normal temperature. Then, the battery performance was measured.

[Measurement Result]

Figure 10:
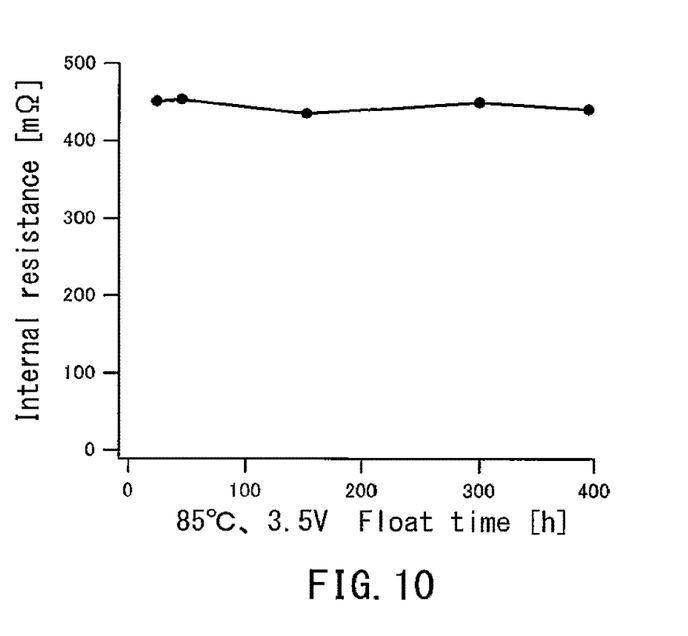
FIG. 10 is a graph showing temporal changes of the internal resistance (m Ω) of lithium ion secondary battery of Example 1 at 85° C.
Figure 11:
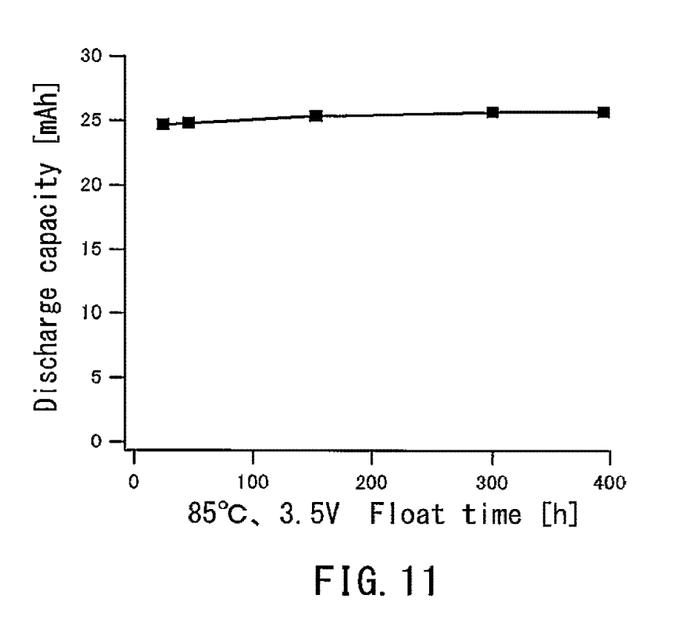
FIG. 11 is a graph showing temporal changes of the discharge capacity (mAh) of lithium ion secondary battery of Example 1 at 85° C.

The change of the internal resistance (mΩ) of the lithium ion secondary battery of Example 1 over a period of time is shown in FIG. 10, and the of the discharge capacity , (mAh) over the period of time is shown in FIG. 11. Further, the change of the internal resistance (mΩ) of the lithium ion secondary battery of Example 2 over the period of time is shown in FIG. 12, and the change of the discharge capacity (mAh) over the period of time is shown in FIG. 13.

As shown in FIG. 10, the internal resistance (mΩ) of the lithium ion secondary battery of Example 1 did not significantly increase, even after 400 hours had passed. Further, as shown in FIG. 11, the discharge capacity (mAh) of the lithium ion secondary battery of Example 1 did not significantly decrease, even after 400 hours had passed. As a result, it was confirmed that the lithium ion secondary battery of Example 1 has heat resistance and high temperature durability at 85° C.

Figure 12:
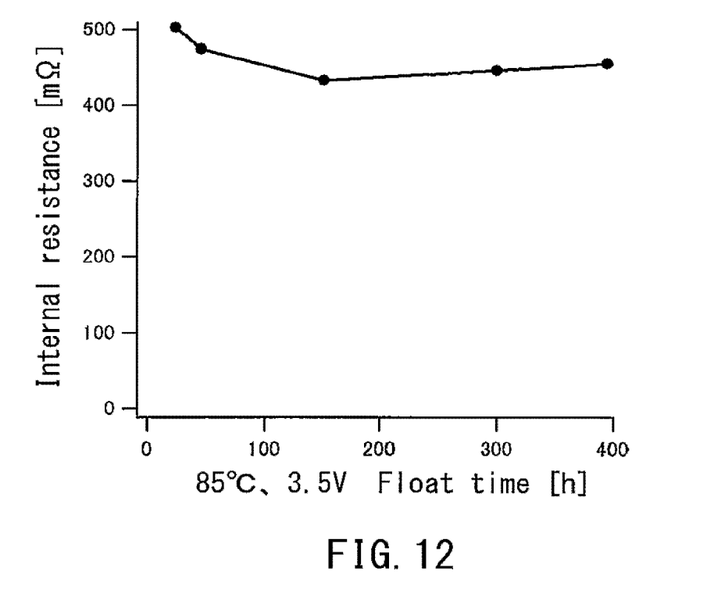
FIG. 12 is a graph showing temporal changes of the internal resistance (m Ω) of lithium ion secondary battery of Example 2 at 85° C.
Figure 13:
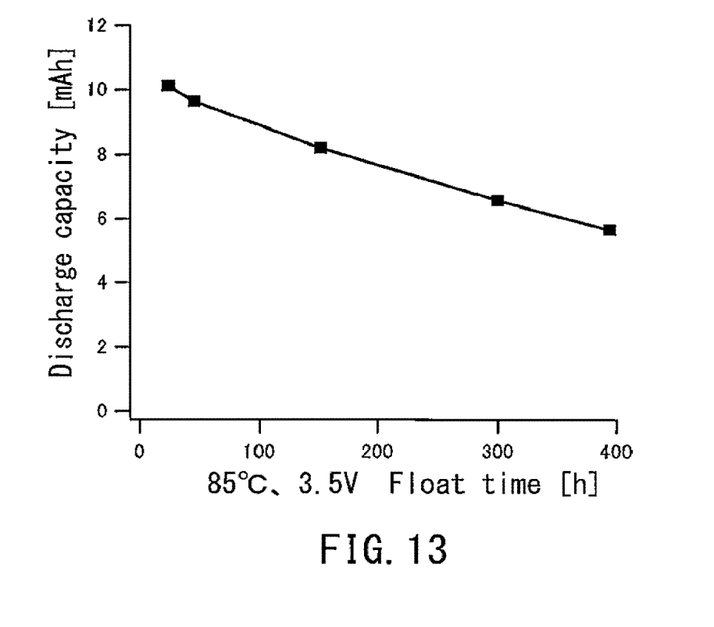
FIG. 13 is a graph showing temporal changes of the discharge capacity (mAh) of lithium ion secondary battery of Example 2 at 85° C.

For the lithium ion secondary battery of Example , as shown in FIG. 12, the internal resistance (mΩ) did not significantly increase, even after 400 hours had passed. However, as shown in FIG. 13, the discharge capacity (mAh) of the lithium ion secondary battery of Example 2 decreased as time passed. Accordingly, it was clarified that the lithium ion secondary battery of Example 2 has heat resistance capable of operating in an environment of 85° C. but that its high temperature durability is lower than that of Example 1.

<Consideration of the Effects of Dope Ratio>

Next, the effects of the dope ratio of the lithium ions $Li^+$ has been considered. The following, test has been conducted with the lithium ion secondary battery of Examples 3 to 5 created in the same manner as Example . However, the process has been adjusted so that for Example 3 the dope ratio was 80%, for Example 4 the dope ratio was 90%, and for Example 5 the dope ratio was 100%.

[Float Test]

Figure 14:
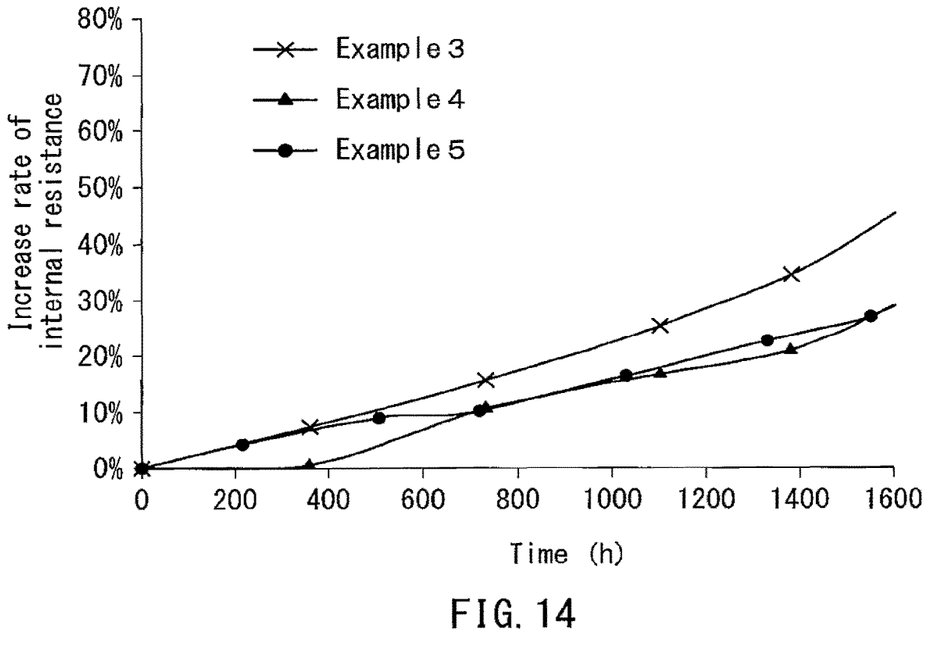
FIG. 14 is a graph showing temporal changes of the internal resistance of lithium ion secondary batteries of Examples 3-5 at 85° C.
Figure 15:
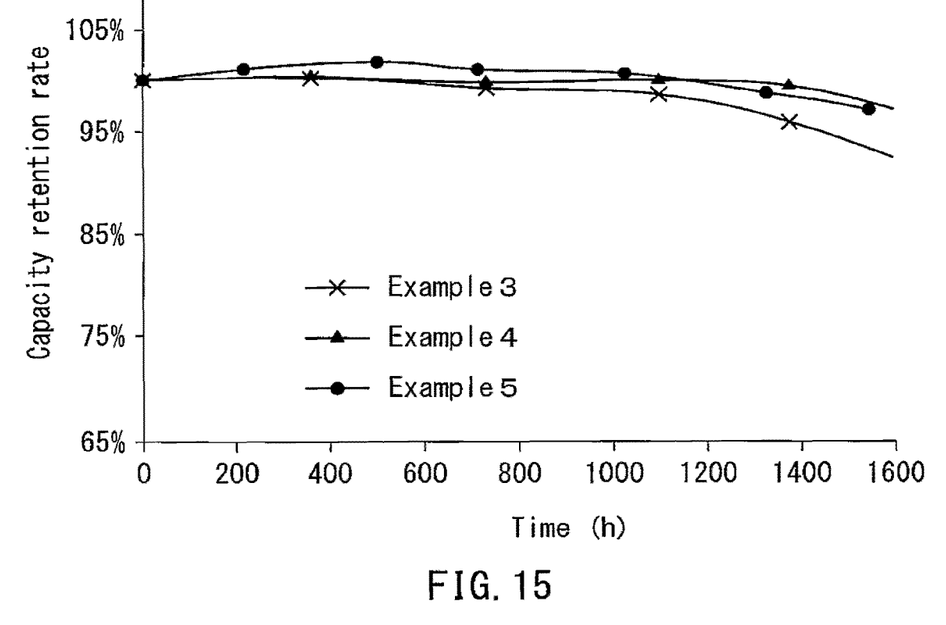
FIG. 15 is a graph showing temporal changes of the discharge capacity of lithium ion secondary batteries of Examples 3-5 at 85° C.

The initial internal resistance and discharge capacity were measured with the lithium ion secondary battery at a normal temperature (25° C.), the cut-off voltage at 3.0 to 3.5 V. the electricity current measured at 5 mA, and 0.2 C. The internal resistance (mΩ) was measured using the DC-IR method, at 0 to 0.1 seconds. Next, the lithium ion secondary batteries were retained at a voltage of 3.8 V using an external power supply. They were left inside a constant temperature water bath of 85° C. After set periods of time had passed, the lithium ion secondary batteries were collected from the constant temperature water bath, cooled to a normal temperature, and had their battery performance tested as specified above. The increase of internal resistance for Examples 3 to 5 is shown in FIG. 14. FIG. 15 shows the change in discharge capacity rate for Examples 3 to As shown in FIG. 14, after 1,600 hours, the increase rates of internal resistance was less than 50 percent for each of the lithium ion secondary battery of Examples 3 to 5. Also, as shown in FIG. 15, after 1,600 hours, the capacity retention rate was more than 85 percent for each of the lithium ion secondary battery of Examples 3 to 5. From these results, it has become clear that the lithium ion secondary batteries in Examples 3 to 5 have heat resistance at 85° C. as well as high durability in such a high temperature environment. Further, Examples 4 and 5 showed better results than Example 3, with regards to the increase of internal resistance and the discharge capacity rate. As a result, it has been discovered that it is preferable to have a dope ratio of 90 to 100 percent, rather than 80 percent.

<Consideration of the Effect of RED Value>

Next, the effect of the RED value was considered. Since only the positive electrode and the electrolytic solution were changed from the above method in the production of the lithium ion secondary battery, only these changes will be described below, and duplicate description will be omitted.

[Preparation of Positive Electrode]

Slurries A to C, which include the positive electrode active materials, for the positive electrodes were prepared with the compositions shown in Table 1. The following components were used: $LiFePO_4$ as the positive electrode active material, polyacrylic acid (sodium neutralized salt of polyacrylic acid) as the binder, acrylic acid ester or styrene-butadiene rubber [SBR], acetylene black as the conductive assistant, carboxymethyl cellulose [CMC] as the thickening material, and water as the solvent. In Table 1, "part" indicates a mass part, and "%" indicates a mass %.

[Preparation of Electrolytic Solution]

A mixed solvent of 30 vol % of ethylene carbonate (EC), 30 vol % of dimethyl carbonate (DMC) and 40 vol % of ethyl methyl carbonate (EMC) was used as a solvent. Then, 1 mol/L Lithium bis(fluorosulfony)imide (LiFSI) was added to the mixed solvent to prepare the electrolytic solution I, Further, hexafluorophosphate ($LiPF_6$) was added to the mixed solvent to prepare the electrolytic solution P. A mixed solvent of 30 vol % of ethylene carbonate (EC), 46.7 vol % of ethyl methyl carbonate (EMC), 23.3 vol % of ethylene carbonate (DEC), and 10 vol % of propylene carbonate (PC) was used as a solvent. 1 mol/L of lithium bis(fluarosulfonyl) imide (LiFSI) was added to the mixed solvent to prepare the electrolytic solution 12.

[Assembly of the Lithium Ion Secondary Battery]

A lithium ion secondary battery was prepared according to the following procedure, utilizing the combinations of the positive electrode and the electrolyte shown in Table 2.

TABLE 2

| | Positive electrode (Binder) | Electrolytic solution (Electrolytes) | RED value |
|---|---|---|---|
| Example 6 | A (Polyacrylic acid) | I (LiFSI) | 2.48 |
| Example 7 | A (Polyacrylic acid) | I2 (LiFSI) | Greater than 1 |
| Example 8 | B (Acrylic acid ester) | I (LiFSI) | 0.21 |
| Example 9 | C (SBR) | I (LiFSI) | 0.61 |
| Example 10 | C (SBR) | P ($LiPF_6$) | 0.61 |

[Initial performance test]

Lithium pre-doping, charging/discharging, and aging of the lithium ion secondary batteries of Examples 6 to 10 were performed. Then, the internal resistance and discharge capacity of the lithium ion secondary battery were measured at room temperature (25° C.)at a cutoff voltage of 2.2 to 3.8 V to test the initial performance. The dope ratio was adjusted to 80%.

[Durability Test (85° C. Float Test)]

The lithium ion secondary battery cells of Examples 6-10 were connected to an external power supply to maintain the voltage at 3.8 V. They were then placed in a constant temperature bath of 85° C. for a certain time, which is referred to as the 85° C. and 3.8 V float time. After the lapse of this time, each lithium ion secondary battery cell was taken out of the constant temperature bath and cooled to the room temperature. Then, using the same conditions as the initial performance test described above, the internal resistance and discharge capacity were measured to determine the capacity retention rate (the percentage of the discharge capacity considering that the initial discharge capacity is 100%) and the increase of internal resistance (the rate of increase from the initial performance). The results are shown in Table 3.

TABLE 1

| Slurry for Positive electrode | Binder type | Positive electrode active materials | Conductive assistant | Binder | Thickening material | Solvent |
|---|---|---|---|---|---|---|
| A | Polyacrylic acid | 88 parts | 15 parts (17%) | 6 parts (7%) | — | 345 parts |
| B | Acrylic acid ester | 88 parts | 15 parts (17%) | 3 parts (3%) | 1 part | 220 parts |
| C | SBR | 88 parts | 15 parts (17%) | 1 part (1%) | 1 part | 220 parts |

TABLE 3

| | | \multicolumn{7}{c|}{85° C., 3.8 V Float time (h)} |
| | | 0 | 180 | 230 | 500 | 550 | 787 | 1000 |
|---|---|---|---|---|---|---|---|---|
| Example 6 | Capacity retention rate | 100% | 119% | | | 115% | | 93% |
| | Increase rate of internal resistance | 0% | 4% | | | 42% | | 283% |
| Example 7 | Capacity retention rate | 100% | | 105% | 104% | | 101% | 100% |
| | Increase rate of internal resistance | 0% | | 0% | 3% | | 11% | 15% |
| Example 8 | Capacity retention rate | 100% | 104% | — | — | — | — | — |
| | Increase rate of internal resistance | 0% | 438% | — | — | — | — | — |
| Example 9 | Capacity retention rate | 100% | | | 115% | | | 100% |
| | Increase rate of internal resistance | 0% | | | 297% | | | 1035% |
| Example 10 | Capacity retention rate | 100% | 48% | — | — | — | — | — |
| | Increase rate of internal resistance | 0% | 116% | — | — | — | — | — |

As can be seen from Table 3, when the lithium ion secondary battery cell from Example 10, where the electrolyte of the electrolytic solution is lithium fluoride phosphate, which is not an imide-based lithium salt, is exposed to a high temperature environment of 85° C., the capacity retention rate is half after 180 hours of exposure. Whereas, in Examples 6-9, where the electrolytic solution contains an imide-based lithium salt as the electrolyte, a high capacity retention rate was maintained for a long time. However, it has become clear from the experimental results that even if the electrolytic solution contains an imide-based lithium salt as the electrolyte, there is a difference in the increase of internal resistance depending on composition of the polymer used as the positive electrode binder. When the results are compared with regard to the RED values of the polymer for the positive electrode binder with respect to the electrolytic solution (see Table 2), it has been found that the increase of internal resistance was high for Example 8, in which acrylic acid ester, whose RED value is less than one, was used, and for Example 9, in which SBR, which also has a RED value less than one, was used. In contrast, in Examples 6 and 7, the electrolytic solution contains an imide-based lithium salt as the electrolyte, and the polymer of the positive electrode binder was polyacrylic acid, whose RED value is greater than one with respect to the electrolytic solution. Accordingly, the polymer in the positive electrode binder is difficult to dissolve in the electrolytic solution. It has become clear that in these cases, a high capacity retention rate was maintained, and the increase of internal resistance was suppressed to be small, even when the battery cell was exposed to a high temperature environment of 85° C.

The invention claimed is:

1. A lithium ion secondary battery, comprising:
a positive electrode active material which stores and releases lithium ions;
a positive electrode binder which binds the positive electrode active material;
a negative electrode active material which stores and releases lithium ions;
a negative electrode binder which binds the negative electrode active material; and
an electrolytic solution comprising an organic solvent and an imide-based lithium salt, wherein:
the organic solvent comprises ethylene carbonate, ethyl methyl carbonate, diethyl carbonate and propylene carbonate,
the organic solvent does not comprise dimethyl carbonate,
the negative electrode active material is pre-doped with lithium ions;
the positive electrode binder has a relative energy difference (RED) value greater than 1, based on a Hansen solubility parameter, relative to the electrolytic solution; and
a doping ratio of the negative electrode active material is 90% to 100%;
wherein
the doping ratio is defined as follows:
doping ratio (%)=$N/N_t \times 100$
wherein N is an amount of lithium ions stored in the negative electrode active material at full charge, and $N_t$ is an amount of lithium ions that could be stored in the non-predoped negative electrode active material.

2. The lithium ion secondary battery of claim 1, wherein an upper limit of an operating potential of the positive electrode active material based on Li is less than a predetermined value.

3. The lithium ion secondary battery of claim 2, wherein:
the positive electrode active material is disposed on a positive electrode current collector, and
the predetermined value is an operating potential of the positive electrode current collector.

4. The lithium ion secondary battery of claim 1, wherein at least one of the positive electrode binder and the negative electrode binder is polyacrylic acid.

* * * * *